United States Patent
Macernis

(10) Patent No.: US 9,523,219 B2
(45) Date of Patent: Dec. 20, 2016

(54) SAFETY, SELF-LATCHING, MAGNETIC GATE LATCH DEVICE

(71) Applicant: Audrius Macernis, Seaford (AU)

(72) Inventor: Audrius Macernis, Seaford (AU)

(*) Notice: Subject to any disclaimer, the term of this patent is extended or adjusted under 35 U.S.C. 154(b) by 79 days.

(21) Appl. No.: 14/285,633

(22) Filed: May 23, 2014

(65) Prior Publication Data

US 2015/0337575 A1    Nov. 26, 2015

(51) Int. Cl.
| | | |
|---|---|---|
| E05C 19/16 | (2006.01) | |
| E05B 47/00 | (2006.01) | |
| H01F 7/04 | (2006.01) | |
| E05B 65/00 | (2006.01) | |
| B60J 7/057 | (2006.01) | |

(52) U.S. Cl.
CPC ......... *E05B 47/004* (2013.01); *E05B 65/0007* (2013.01); *E05B 65/0014* (2013.01); *E05C 19/16* (2013.01); *H01F 7/04* (2013.01); *B60J 7/0573* (2013.01); *Y10T 292/11* (2015.04)

(58) Field of Classification Search
CPC .... H01F 7/04; Y10T 292/11; Y10T 292/1014; E05B 47/0038; E05B 47/004; E05B 47/0046; E05B 1/0092; E05B 65/0007; E05B 65/0014; E05C 19/16; E05C 19/163; E05C 1/166; E05C 5/00; E05C 5/02; E05C 7/04
USPC ........ 292/251.5, 57, 60, 138, 145, 163, 175, 292/347, 336.3
See application file for complete search history.

(56) References Cited

U.S. PATENT DOCUMENTS

| | | | | |
|---|---|---|---|---|
| 5,362,116 A | * | 11/1994 | Doyle | ................... E05C 19/163 292/144 |
| 6,666,435 B2 | * | 12/2003 | Blosfelds | ................ E05C 19/16 256/24 |
| 7,100,405 B2 | * | 9/2006 | West | ....................... E05B 19/04 292/13 |
| 8,376,421 B2 | * | 2/2013 | Simmonds | ............ E05B 15/101 292/251.5 |

(Continued)

FOREIGN PATENT DOCUMENTS

| | | | | |
|---|---|---|---|---|
| AU | WO 9203631 A1 | * | 3/1992 | ........... E05C 19/163 |
| AU | WO 2007070977 A1 | * | 6/2007 | ............... E04H 4/06 |

(Continued)

*Primary Examiner* — Kristina Fulton
*Assistant Examiner* — Christine M Mills

(57) ABSTRACT

Disclosed is a self-latching gate latch device. The device comprises a latch and a magnet bar housing assembly wherein, the latch assembly comprises a horizontal latch bar that is horizontally movable between a forward latch bar engagement position and a backward default latch bar disengagement position and wherein, the magnet assembly comprises a magnet bar that is vertically movable between a default downward magnet bar engagement position and an upward magnet bar disengagement position. The bottom end of the magnet bar is secured with a magnet. When the magnet bar is in the default position thereof, the attraction force between the magnet and the latch bar causes the latch bar to move to the latch bar engagement position at which point, the latch bar engages the magnet assembly. A twist knob that operates a guide and track mechanism is provided wherein, twisting and lifting the twist knob causes the magnet bar to move to the magnet bar disengagement position, which, in turn, causes the latch bar to move to its default position.

9 Claims, 20 Drawing Sheets

(56) References Cited

U.S. PATENT DOCUMENTS

| | | | | |
|---|---|---|---|---|
| 8,393,653 B2* | 3/2013 | Clark | .................... | E05B 13/002 |
| | | | | 292/137 |
| 8,505,989 B2* | 8/2013 | Wells | ................... | E05B 63/248 |
| | | | | 292/177 |
| 2005/0210938 A1* | 9/2005 | Doyle | .................. | E05C 19/163 |
| | | | | 70/276 |
| 2008/0296915 A1* | 12/2008 | Clark | .................... | E05B 13/101 |
| | | | | 292/251.5 |
| 2011/0148126 A1* | 6/2011 | Macernis | ............ | E05B 65/0007 |
| | | | | 292/251.5 |
| 2014/0054904 A1* | 2/2014 | Andrews | ............... | E05C 19/163 |
| | | | | 292/144 |
| 2014/0225383 A1* | 8/2014 | Simmonds | ................ | E05C 1/08 |
| | | | | 292/238 |
| 2015/0015002 A1* | 1/2015 | Macernis | ................ | E05C 19/16 |
| | | | | 292/251.5 |

FOREIGN PATENT DOCUMENTS

| | | | | |
|---|---|---|---|---|
| AU | WO 2011088496 A1 * | 7/2011 | ......... | E05B 65/0007 |
| FR | 2871509 A1 * | 12/2005 | ......... | E05B 65/0007 |

* cited by examiner

SAFETY, SELF-LATCHING, MAGNETIC GATE LATCH DEVICE

BACKGROUND

The present invention relates to gate latches, more particularly to safety magnetic gate latches that are installed on swimming pool gates and the operating means thereof are out of the reach of small children, and even more particularly related to a safety magnetic self-latching gate latch that provides extra safety by not only having the operating means thereof out of the reach of small children but also by configuring the operating means such that, a user has to execute a sequence of simple operational steps in order to release the latch.

A conventional swimming pool gate latch basically comprises a latch assembly preferably fitted to a hinged gate and a magnet assembly fitted to a fence post or in some cases another hinged gate. The magnet assembly usually is elongate in construction and is vertically fitted to the fence post. The magnet assembly comprises a release knob disposed atop thereof wherein, the release knob simply needs to be lifted in order to release or unlatch the gate. The gate latch is further designed to be a safety device as the release knob positioned is at that height that it is out of the reach of small children. However, for a determined child, the placement of release knob may not pose that big of a challenge as the release knob can be arguably easily lifted with the help of an elongate object. This is because, the operation of the release knob, as mentioned earlier, is quite simple.

SUMMARY

The present invention is an improved safety self-latching gate latch device that comprises a latch assembly secured that is configured to engage a magnet assembly. The magnet assembly comprises a vertical elongate magnet bar assembly that is vertically slidably received within an elongate magnet housing fitted to a fence post. A top portion of the magnet bar assembly extends beyond the top of the magnet housing, while the bottom extremity of the magnet bar is secured to a magnet. The magnet housing further comprises a latch hole disposed at the bottom portion thereof wherein, when the magnet bar assembly is at rest at a downward position within the magnet housing, the magnet is aligned with the latch hole.

On the other hand, the latch assembly comprises a latch bar attractable by a magnet, horizontally disposed within latch housing wherein, the latch bar is movable between a default latch bar disengagement position and a latch bar engagement position, where a substantial portion of the latch bar extends out of the latch assembly. When the hinged gate closed, the latch bar, due to attraction force of the magnet (in the downward position), arrives into latch bar engagement position at which point, the latch bar adheres to the magnet through the latch hole thereby latching the gate and the fence post.

The magnet bar assembly comprises a twist knob and a pull knob that are co-axial with respect to one another wherein, the twist and the pull knobs make up the upper portion of the magnet bar assembly that extends beyond the top of the magnet housing. A guide and a plurality of tracks are provided for the guide to traverse therethrough. The guide is disposed in operational relationship with the twist knob such that, when the twist knob is twisted or rotated, the guide traverses from a first to second guide position wherein, a vertical track commences from the point where the guide is at the second guide position. At the second guide position, as the twist and pull knobs are lifted, the guide simultaneously traverses the vertical track thereby causing the magnet bar assembly and the magnet to be elevated upward. As the magnet position is moved upwards, the increase in the distance between the magnet and the latch bar causes the attraction force therebetween to weaken resulting the latch bar being retracted to its default position thereby, ultimately resulting in the hinged door being unlatched from the fence post.

Other objects and advantages of the embodiments herein will become readily apparent from the following detailed description taken in conjunction with the accompanying drawings.

FIGURES

Reference Numerals

10 . . . Safety Self-latching Magnetic Gate Latch Device
12 . . . Hinged Gate
14 . . . Fence Post
16 . . . Latch Bar Housing Assembly (Latch Assembly)
18 . . . Magnet Bar Housing Assembly (Magnet Assembly)
20 . . . Latch Bar Housing
22 . . . Side Cap
24 . . . Latch Bar
26 . . . Latch Bar Elongate Section
28 . . . Latch Bar Head Section
30 . . . Internal Wall Member
32 . . . Ring-shaped Washer
34 . . . Compression Spring
36 . . . Magnet Bar Housing
38 . . . Latch Hole
40 . . . Top Cap
42 . . . Central Hole of the Top Cap
44 . . . Cap Sleeve
46 . . . First Vertical Track
48 . . . Second Vertical Track
50 . . . Stopper
52 . . . Magnet Bar Assembly
54 . . . Magnet Bar
56 . . . Guide Sleeve
58 . . . Track Sleeve
60 . . . Pull Knob
62 . . . Magnet
64 . . . Guide Sleeve Body
66 . . . Twist Knob
68 . . . Guide
70 . . . Indentation
72 . . . Directional Arrow Marking
74 . . . Projecting Groove
76 . . . Angular Horizontal Track
78 . . . Sealing Washer
80 . . . Torsion Spring
82 . . . Lock Washer
84 . . . Thrust Washer
86 . . . Flat Washer

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1:
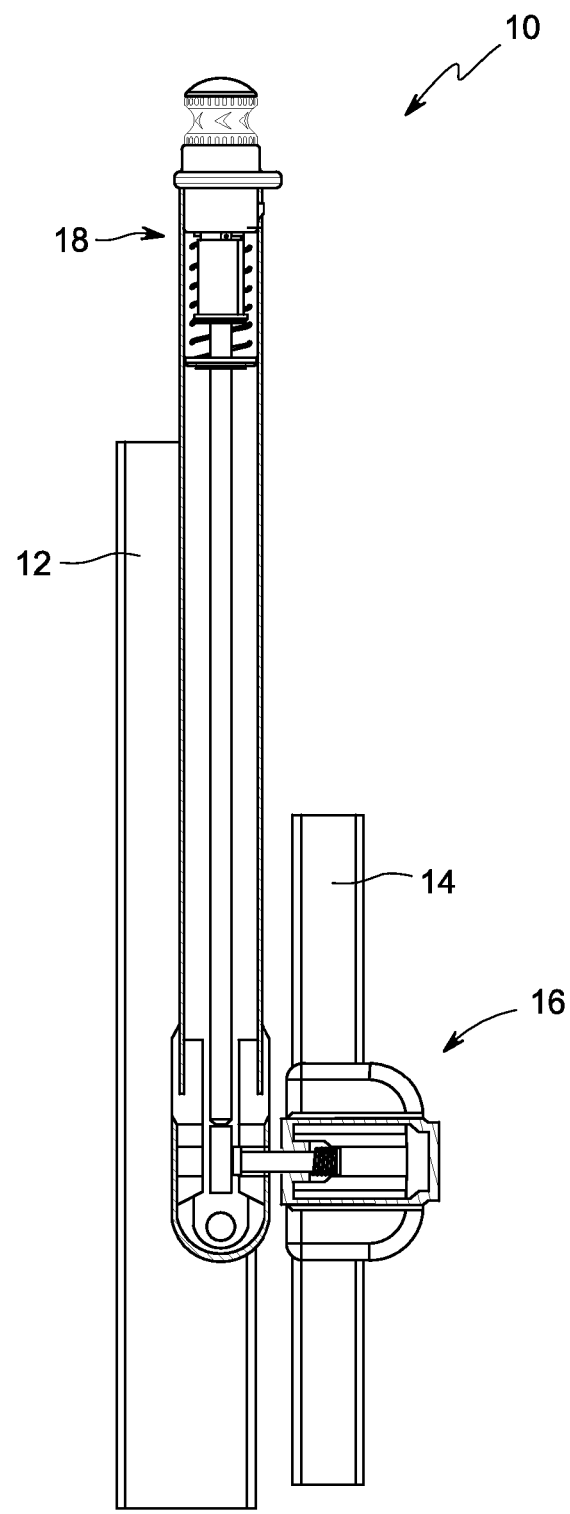
FIG. 1, according to an embodiment of the present invention, is an illustration of the front view of the self-latching device with only the latch and magnet assembly housings being sectioned off.

Referring to FIG. 1, the present invention comprises an improved self-latching magnetic gate latch device 10 for releasingly securing or simply latching a hinged gate 12 to a barrier member, which generally comprises a fence post 14. However, the barrier member could be another hinged gate as well. More particularly, the self-latching device 10 is especially designed to be a safety device for installation on swimming pool gates. The self-latching device 10, like any conventional latching device, comprises two basic parts or components, viz., a latch bar housing assembly 16 (hereinafter referred to as "latch assembly" 16) and a magnet bar housing assembly 18 (hereinafter referred to as "magnet assembly" 18), that are configured to engage one another in order to latch the hinged gate 12 and the barrier member.

Figure 2:
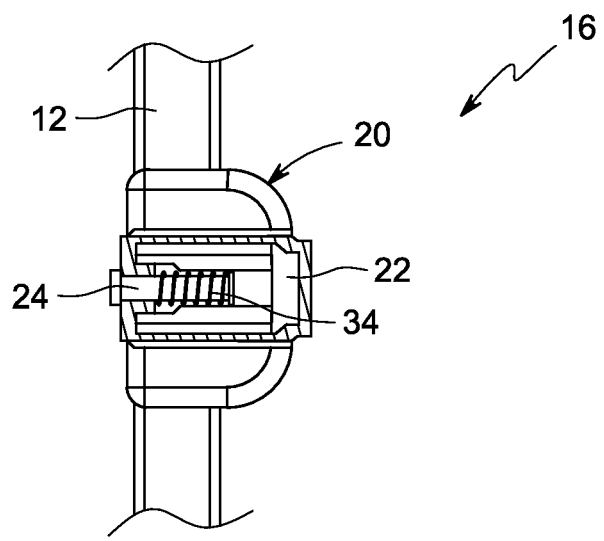
FIG. 2, according to an embodiment of the present invention, is an illustration of the front view of the latch assembly housing with the latch bar being in the default latch bar disengagement position; the latch assembly housing being sectioned off.

Referring to FIG. 2, the latch assembly 16 comprises a substantially rectangular latch bar housing 20 (hereinafter referred to as "latch housing" 20) secured to a vertical end section at the free extremity of the hinged gate 12 such that, the latch housing 20 is horizontally oriented. The latch housing 20 is secured to the hinged gate 12 preferably by means of commonplace securing means, such as brackets. Either side end of the latch housing 20 is open wherein, the opening, which is disposed away from the free end of the hinged gate 12, is larger than the other so as to provide access to the components within the latch housing 20 for maintenance purposes. The larger side opening is removably sealed off with a side cap 22.

Figure 3:
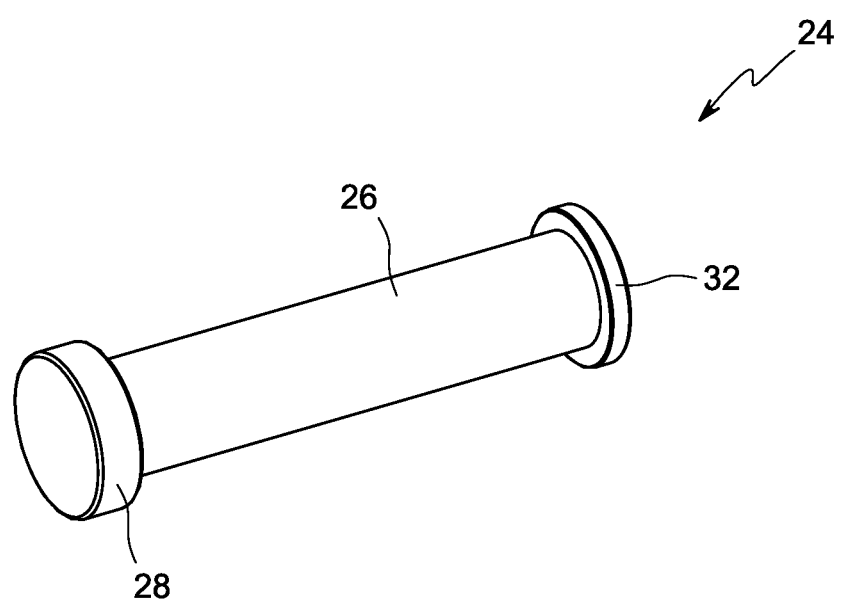
FIG. 3 is an illustration of a perspective view of the latch bar according to an embodiment of the present invention.

Referring to FIGS. 2 and 3, the latch housing 20 further comprises a horizontal latch bar 24 disposed therewithin wherein, the latch bar 24 is attractable by a magnet. The latch bar 24 is a unitary piece composed of two coaxial sections viz., a latch bar elongate section 26 and a latch bar head section 28 extending from an extremity of the latch bar elongate section 26 wherein, the latch bar head section 28 is disposed at the extremity of the hinged gate 12. Each of the two sections 26 and 28 is of uniform circular cross-section with the cross-sectional diameter of the latch bar elongate section 26 being lesser than that of the latch bar head section 28. The free end of the latch bar head section 28 is preferably configured to be flat. The smaller side opening of the latch assembly housing 20 is configured to be smaller than the cross-sectional diameter of the latch bar head section 28 while being larger than that of the latch bar elongate section 26. This results in the latch bar elongate section 26 being within the latch assembly housing 20, while the latch bar head section 28 remains out of the latch assembly housing 20 at all times.

Figure 4:
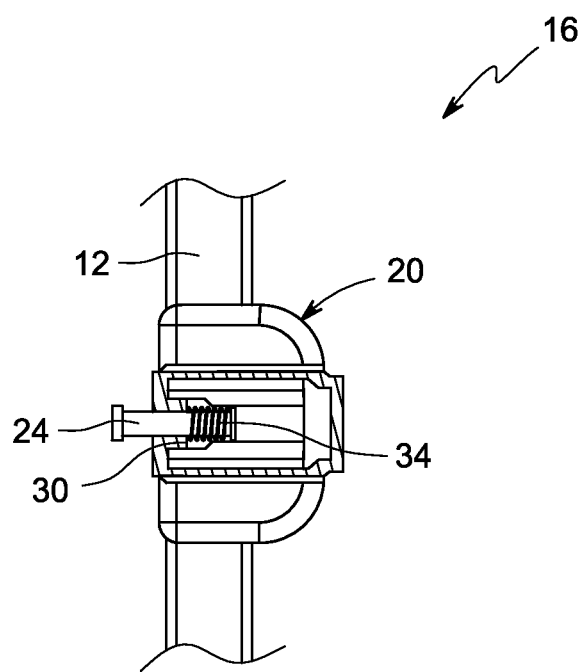
FIG. 4, according to an embodiment of the present invention, is an illustration of the front view of the latch assembly housing with the latch bar being in the latch bar engagement position; the latch assembly housing being sectioned off.
Figure 5:
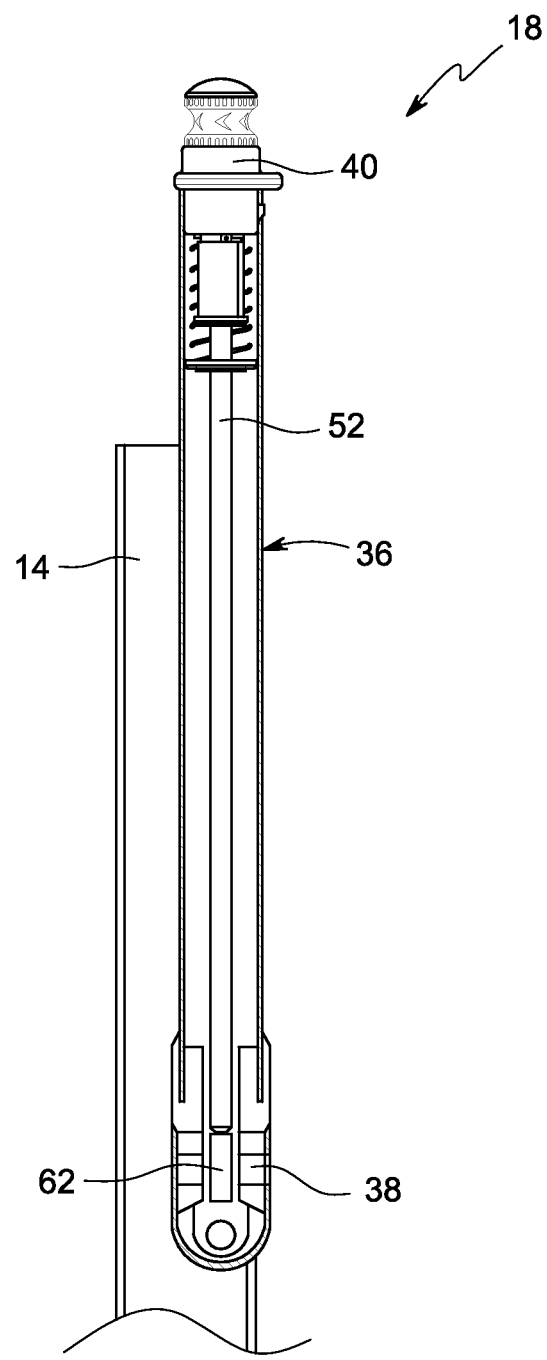
FIG. 5, according to an embodiment of the present invention, is an illustration of the front view of the magnet assembly with the magnet bar being in the default downward magnet bar engagement position.

Referring to FIGS. 2 through 4, the latch bar 24 is slidably disposed within the latch housing 20 such that, the latch bar 24 is movable from a default backward latch bar disengagement position (FIG. 2), where the latch bar elongate section 26 is completely within the latch housing 20, to a forward latch bar engagement position (FIG. 4), where a substantial length of the latch bar elongate section 26 extends of the smaller side opening of the latch housing 20. The latch housing 20 further comprises an internal wall member 30 disposed therewithin at small distance away from the middle thereof and towards the smaller side opening. The wall member 30 comprises a central hole through with the latch bar elongate section 26 is slidably received as the latch bar 24 is received within the latch housing 20. The latch bar 24 further comprises a ring-shaped washer 32 encircling the free extremity (opposite to the head section 28) of the latch bar elongate section 26. A compression spring 34 is coiled around the latch bar elongate section 26 between the wall member 30 and the washer 32 so as to enable the latch bar 24 to be biased towards the latch bar disengagement position (FIG. 2).

Figure 8:
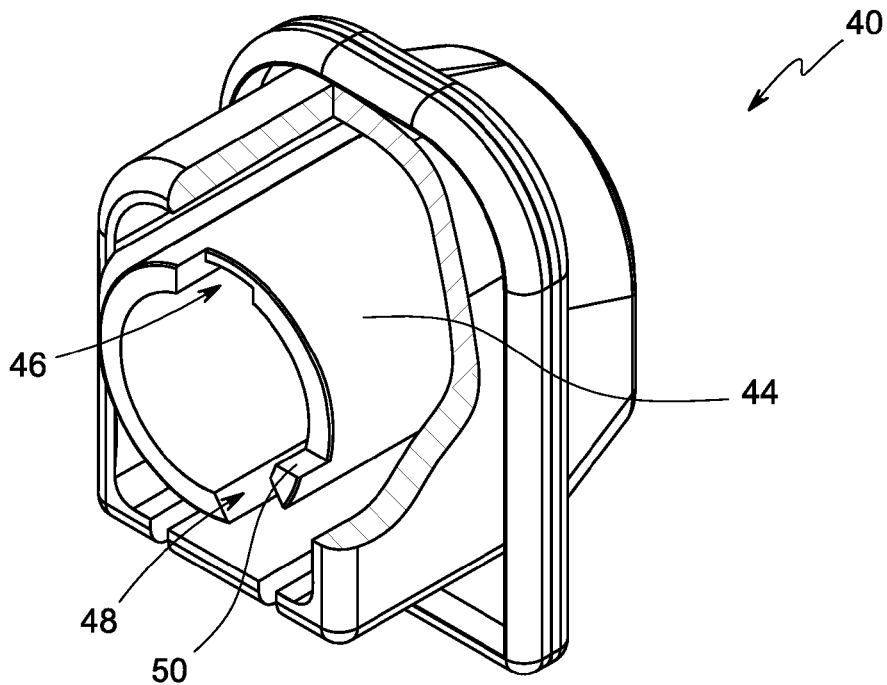
FIG. 8, according to an embodiment of the present invention, is an illustration of a perspective view of the top cap with a portion thereof sectioned to provide a view of the cap sleeve.
Figure 9:
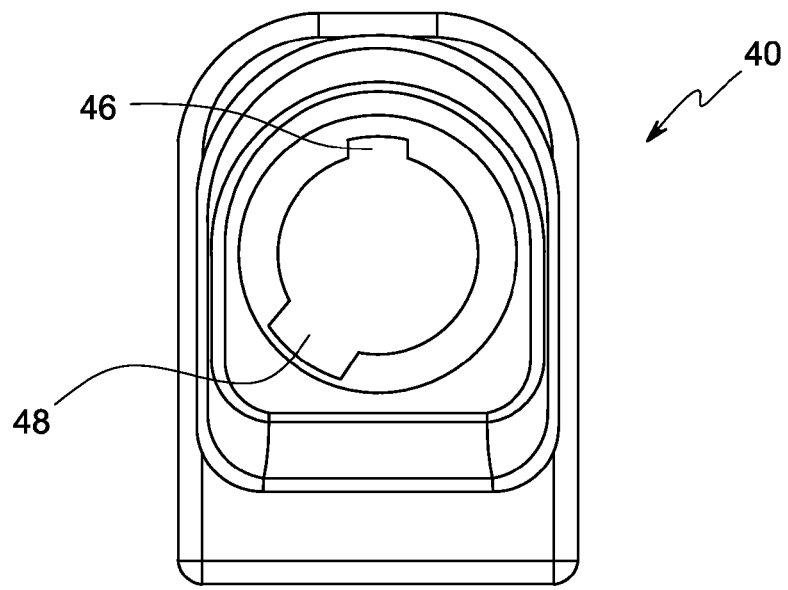
FIG. 9, according to an embodiment of the present invention, is an illustration of the front view of the top cap.

Referring to FIGS. 1, and 5 through 9, the magnet assembly 18 comprises a substantially rectangular elongate magnet assembly housing 36 (hereinafter referred to as "magnet housing" 36) that is vertically secured to a fence post 14 by means of securing means such as, brackets and fasteners preferably. The magnet housing 36 comprises a latch hole 38 disposed at the bottom of the one of the vertical rectangular sides thereof. More particularly, the magnet housing 36 is secured to the fence post 14 such that, latch hole 38 aligns with the smaller side opening of the latch housing 20 as seen in FIG. 1. The latch hole 38 is configured to be dimensionally larger than the latch bar head section 28, the reason for which will become apparent from the following body of text. The magnet housing 36 has an open top for providing access to the internal components thereof for maintenance purposes. The open top is removably fitted with a substantially rectangular top cap 40 comprising a central hole 42 centrally disposed thereon. The top cap 40 further comprises a cylindrical cap sleeve 44 (FIG. 6) descending vertically from the circumference of the central hole 42. Referring particularly to FIGS. 8 and 9, the cap sleeve 44 comprises almost opposingly-disposed first and second vertical tracks 46 and 48 both extending along the length of the cap sleeve 44. Notably, the second track 48, unlike the first track 46, is an open track, and is broader than the first track 46. The cap sleeve 44 further comprises a stopper 50 descending integrally from the bottom rim thereof. More particularly, the stopper 50 comprises a simple rectangular piece wherein, one of the vertical side surfaces of the stopper 50 extends from a vertical edge of the second track 48.

Figure 6:
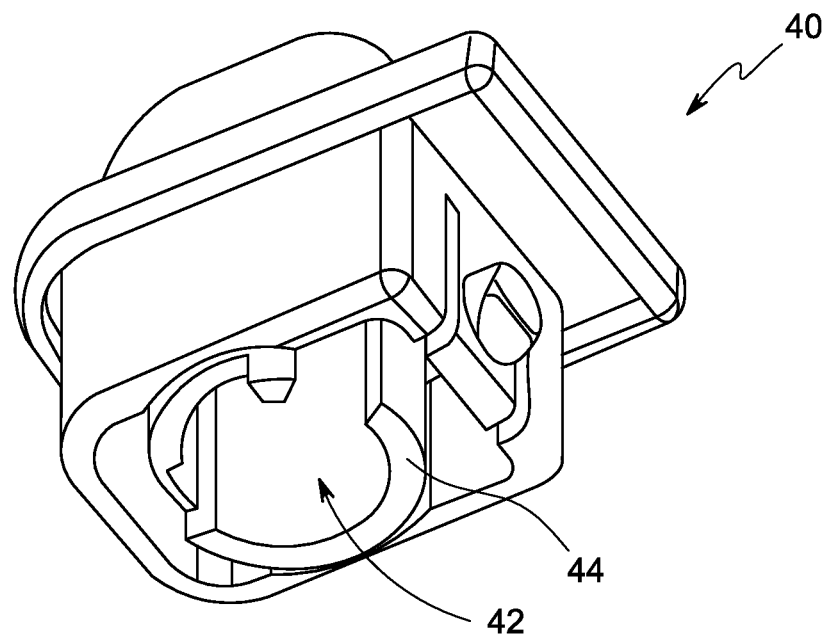
FIG. 6, according to an embodiment of the present invention, is an illustration of the bottom perspective view of the top cap.
Figure 7:
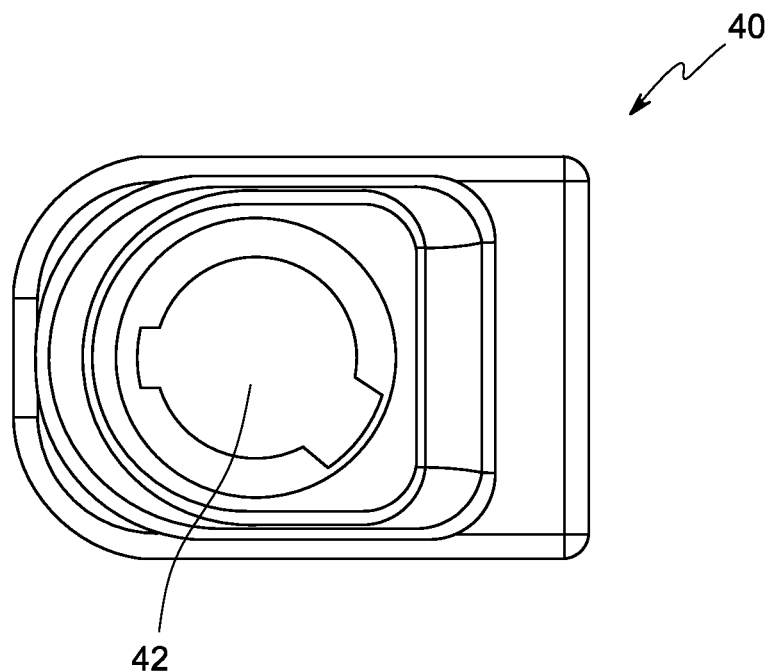
FIG. 7, according to an embodiment of the present invention, is an illustration of the top view of the top cap.
Figure 10:
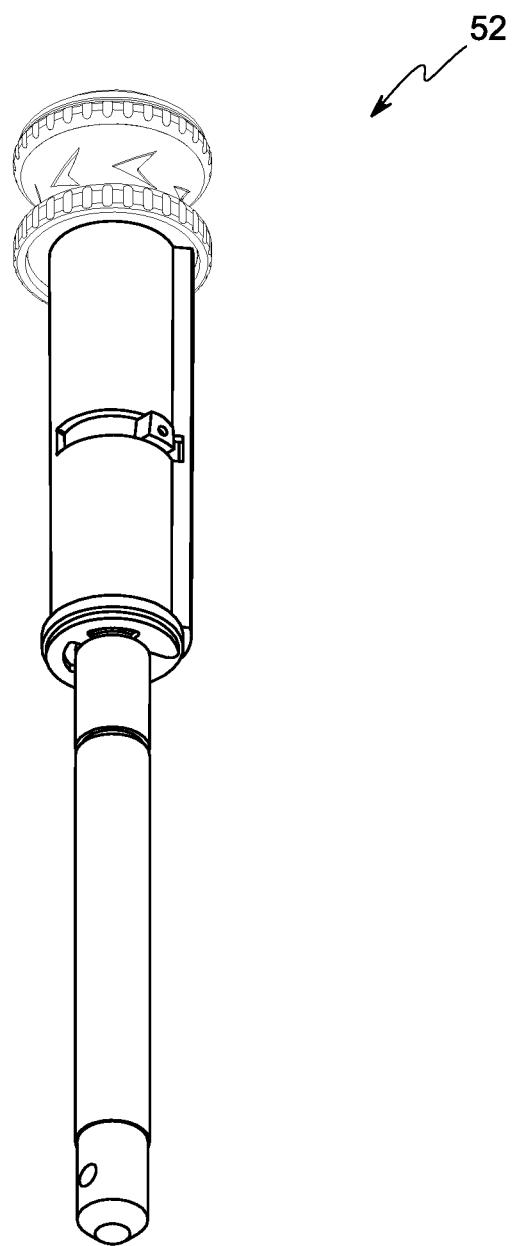
FIG. 10, according to an embodiment of the present invention, is an illustration of a perspective view of the magnet bar assembly.
Figure 11:
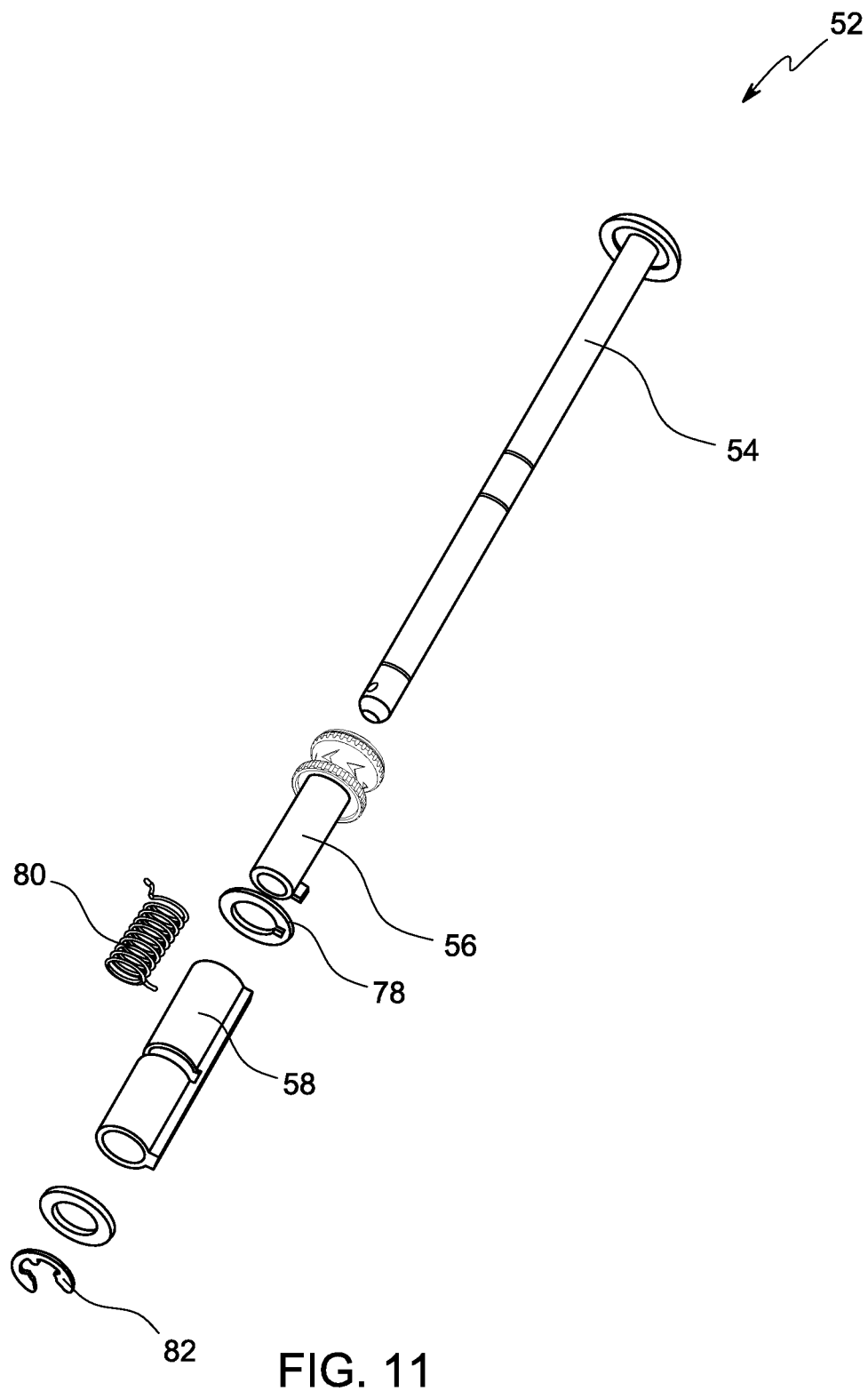
FIG. 11, according to an embodiment of the present invention, is an illustration of an exploded perspective view of the magnet bar assembly.
Figure 12:
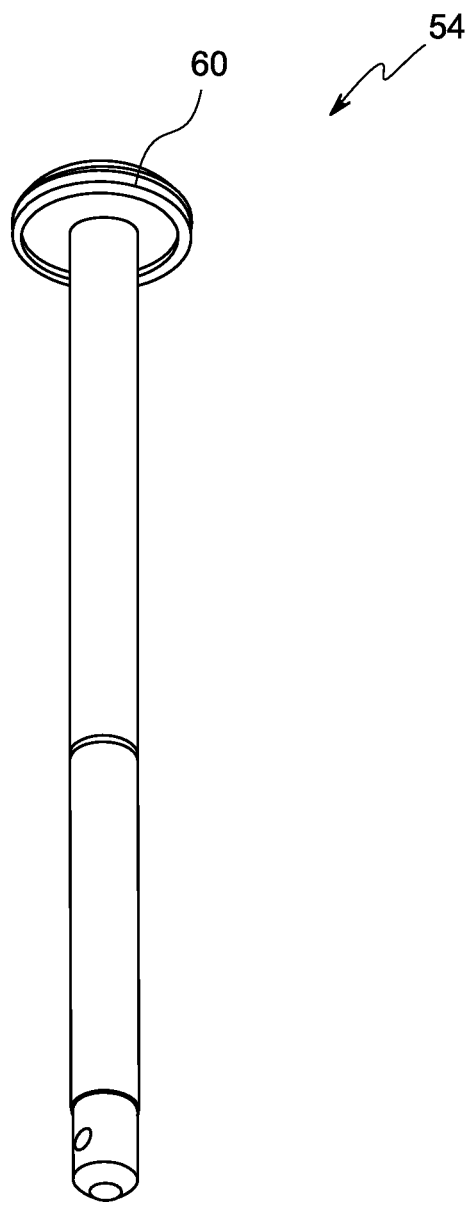
FIG. 12, according to an embodiment of the present invention, is an illustration of a perspective view of the magnet bar.

Referring to FIGS. 1, 5, 10 through 12, the magnet assembly 18 further comprises a magnet bar assembly 52 that extends through the cap sleeve 44 (FIGS. 6 and 8). The magnet bar assembly 52 comprises an assemblage of a plurality of components comprising an elongate, vertically-disposed, cylindrical magnet bar 54, a vertically-disposed, cylindrical guide sleeve 56, and a vertically-disposed, cylindrical track sleeve 58. Referring particularly to FIG. 12, the top end of the magnet bar 54 terminates in a pull knob 60 comprising a flat circular member with the top surface thereof being rounded for ergonomic reasons. In one embodiment, the pull knob 60 is integral with the rest of the magnet bar 54. The bottom end of the magnet bar 54 is adapted to be secured with a magnet 62 (FIG. 5), the utility of which will become apparent in the following body of text. In one embodiment (not shown), the magnet is disposed within a casing that is secured to the bottom of the magnet bar.

Figure 13:
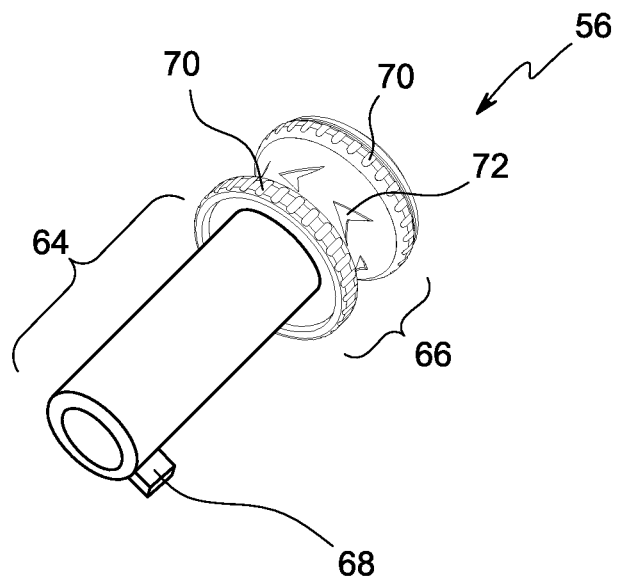
FIG. 13, according to an embodiment of the present invention, is an illustration of a perspective view of the guide sleeve.

Referring to FIGS. 11 through 13, the cylindrical guide sleeve 56, although is a unitary piece, for ease of understanding, is divided into two coaxial sections comprising a hollow cylindrical guide sleeve body 64 and twist knob 66 that extends from the top extremity of the guide sleeve body 64. The guide sleeve body 64 comprises a guide 68 comprising a substantially rectangular projection extending from the outer surface thereof. More particularly, the bottom surface of the guide 68 is flush with the bottom surface of the bottom circular rim of the guide sleeve body 64 as shown in FIG. 12. The guide 68 is dimensionally configured to be snugly and slidably received within the first vertical track 46 of the cap sleeve 44 (FIG. 8). The twist knob 66 comprises a shorter but diametrically wider hollow cylindrical structure compared to the guide sleeve body 64. The outer surface of the twist knob 66 comprises a multiplicity of indentations 70 for gripping purposes. The twist knob 66 further comprises a plurality of directional arrow markings 72 thereon for indicating the direction of twist or rotation, which preferably is clockwise. The guide sleeve 56 is adapted to snugly and slidably receive the magnet bar 54 therewithin such that, the twist knob 66 abuts underneath the pull knob 60.

Figure 14:
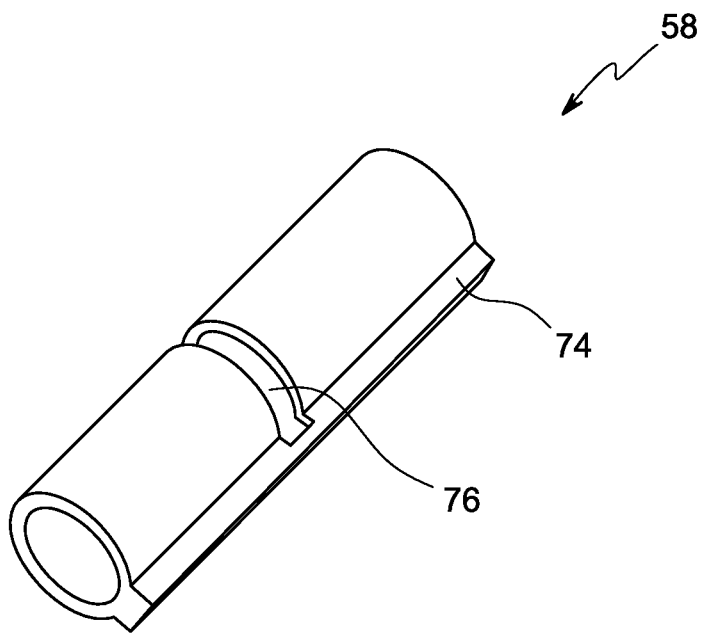
FIG. 14, according to an embodiment of the present invention, is an illustration of a perspective view of the track sleeve.

Referring to FIGS. 10 and 13, the track sleeve 58 comprises a vertical outwardly projecting groove 74 of uniform cross-section that extends from the top to the bottom rim thereof. The outer width of the groove 74 is configured to correspond with the width of the second vertical track 48 (FIG. 6) as the groove is adapted to snugly and slidably receive within the second vertical track 48 (FIG. 6) as the magnet assembly 18 (FIG. 5) is finally assembled. On the other hand, the inner width of the groove 74 is configured to correspond with the width of the guide 68 (FIG. 13) as the guide 68 is adapted to snugly and slidably receive within the groove 74. The track sleeve 58 further comprises angular horizontal track 76 disposed thereon wherein, the horizontal track 76 is adapted to snugly and slidably receive the guide 68 therewithin. More particularly, the horizontal track 76 is disposed substantially midway between top and bottom circular rims of the track sleeve 58 and one extremity of the horizontal track 76 commences from the groove 74 as shown in FIG. 14.

Referring to FIGS. 11 through 14, in order to assemble the guide sleeve 56 and the track sleeve 58, initially a sealing washer 78 is received over the guide sleeve 56 after which, the track sleeve 58 is received over the guide sleeve 56 as the guide 68 is slid into the projecting groove 74. The guide and track sleeves 56 and 58 are configured such that, the substantially circular top rim of the guide sleeve 56, the sealing washer 78, and the circular bottom rim of the twist knob 66 abut one another (without any slack therebetween) as the guide 68 is at the point of entry into the horizontal track 76 or at any point along the length of the horizontal track 76. Further a torsion spring 80 is operationally secured between the guide 68 and track sleeve 58 so as to bias the guide 68 towards one extremity (i.e., the point of entry or the right extremity) of the horizontal track 76, which is the point of entry thereof. Notably, the guide 68 is slidable within the horizontal track 76 as the twist knob 66 is operated. A substantially circular lock washer 82 is secured to the magnet bar 54 underneath the track sleeve 58 for preventing the guide and track sleeves 56 and 58 from sliding down.

Figure 15:
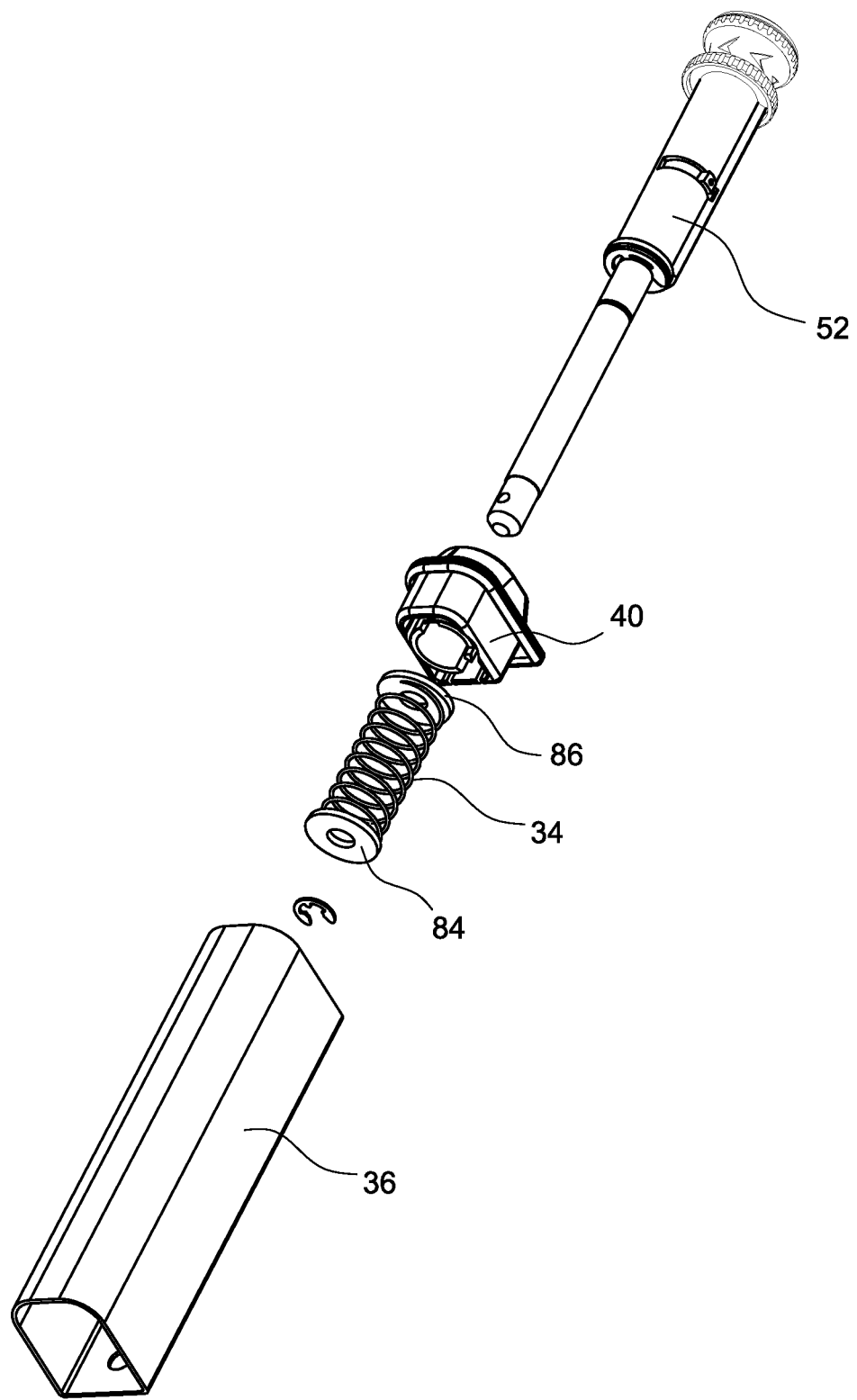
FIG. 15, according to an embodiment of the present invention, is an illustration of an exploded perspective view of the magnet assembly.
Figure 17:
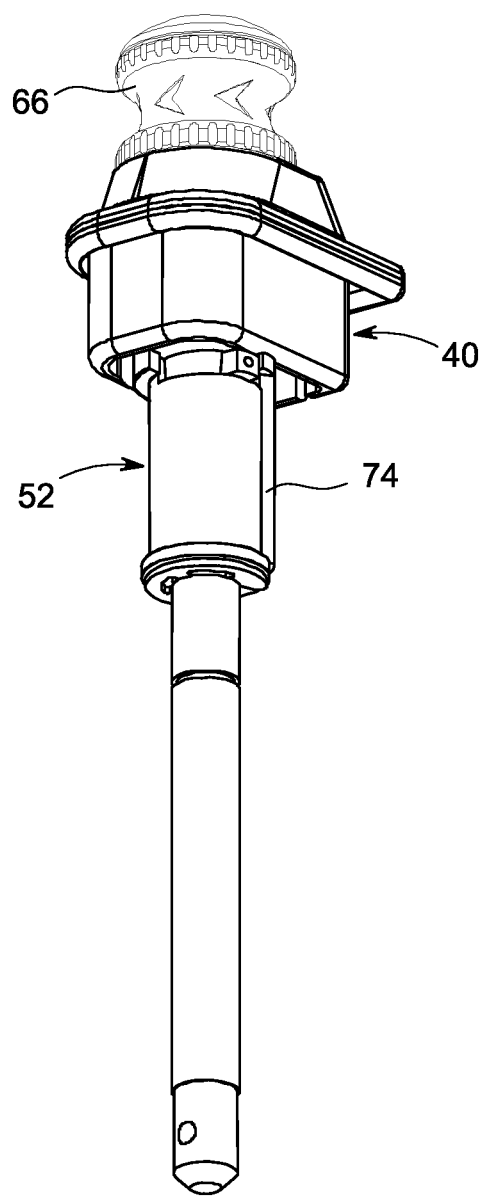
FIG. 17, according to an embodiment of the present invention, is an illustration of a perspective view of the magnet assembly assembled into the top cap.
Figure 18:
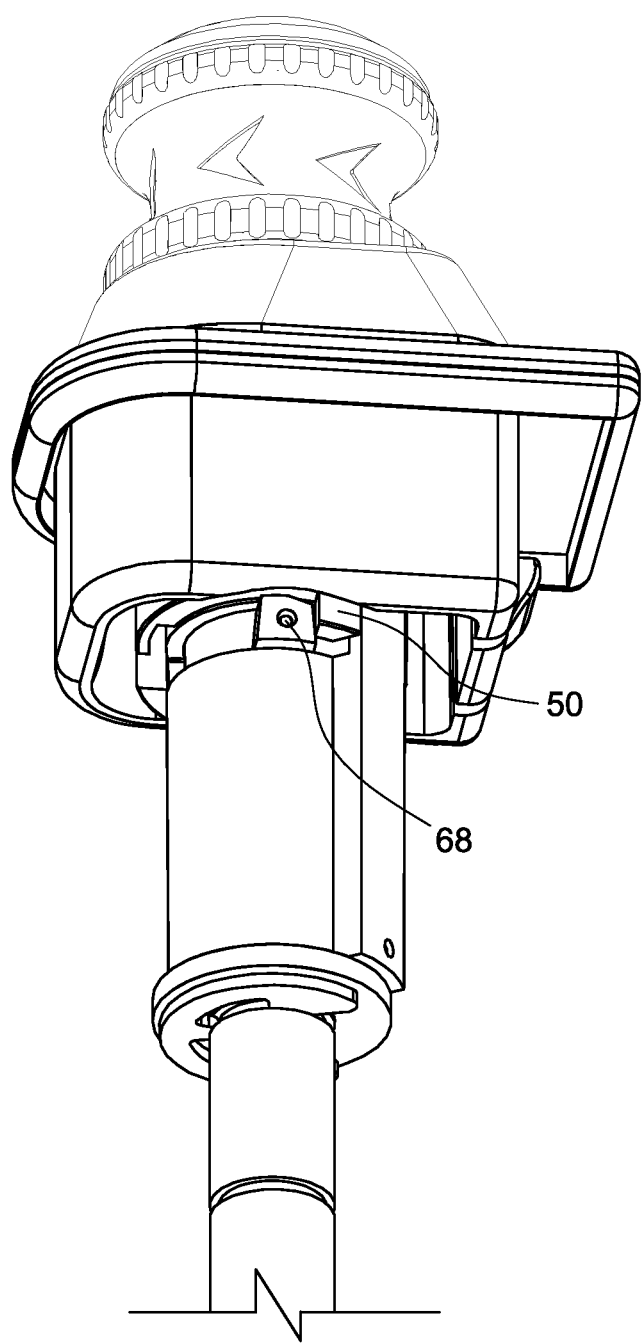
FIG. 18, according to an embodiment of the present invention, is an illustration of a closer view of the default position of the guide abutting the stopper.

Referring to FIGS. 15 and 17, the magnet bar assembly 52 is assembled into the top cap 40 such that, the projecting groove 74 is slidably received within the second vertical track 48 (FIGS. 8 and 9) as the track sleeve 58 (FIGS. 11 and 14) is slidably received within cap sleeve 44 (FIG. 8). More particularly, the magnet bar assembly 52 is slid into the top cap 40 until the bottom rim of the twist knob 66 abuts the top of the top cap 40. The cap sleeve 44 (FIG. 8) is dimensionally configured such that, the bottom circular rim thereof extends till the upper edge of the horizontal track 76 (FIG. 14). Once the magnet bar assembly 52 is received within the top cap 40, the guide 68 (FIG. 13) is further manually adjusted to be disposed between the stopper 50 (FIG. 6) and the closed extremity of the horizontal track 76 (FIG. 14) as seen closely in FIG. 18. Notably, as enabled by the torsion spring 80, the guide 68 always abuts the stopper 50.

Figure 16:
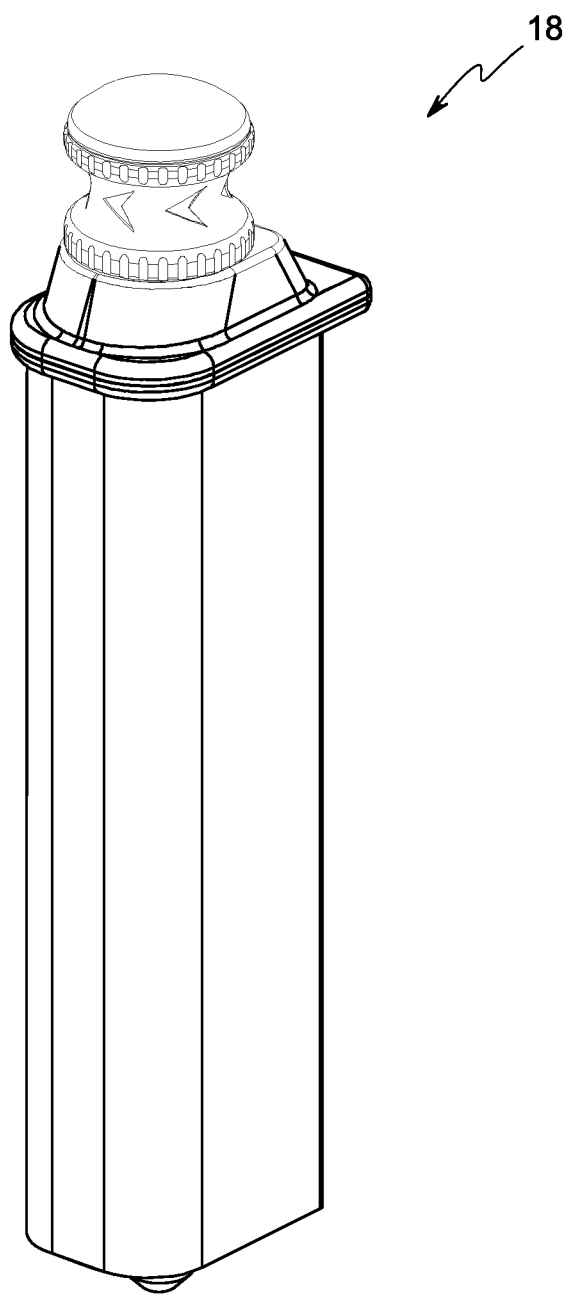
FIG. 16, according to an embodiment of the present invention, is an illustration of a perspective view of the magnet assembly.
Figure 19:
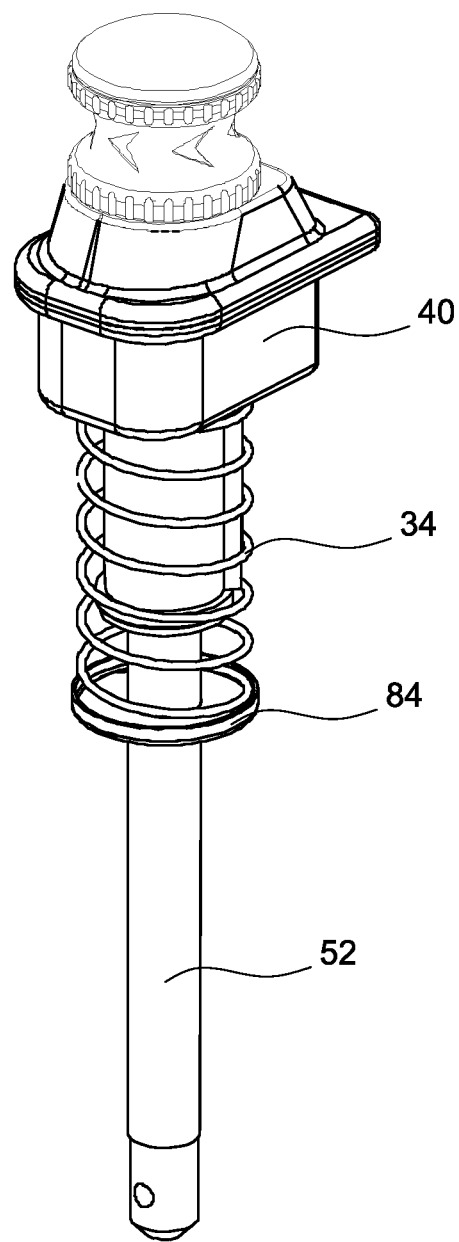
FIG. 19, according to an embodiment of the present invention, is an illustration of a perspective view of the assemblage of the magnet bar assembly, top cap and the compression spring.

Referring to FIGS. 15 and 19, the magnet assembly 18 (FIGS. 1, 5, and 16) further comprises a thrust washer 84 fitted around magnet bar 54 (FIG. 11) beneath the lock washer 82. One end of a compression spring 34 extends above the thrust washer 84, while the other or top end of the compression spring 34 terminates in a flat washer 86 wherein, the flat washer 86 abuts the bottom of the top cap 40. The compression spring 34 exerts a repelling force between the magnet bar assembly 52 and the top cap 40 wherein, the utility of the repelling force will become apparent from the following body of text. The top cap 40 fitted with the magnet bar assembly 52 and the compression spring 34 is inserted into the magnet housing 36 and snap-fitted to open top thereof so as to form the magnet assembly 18 as seen in FIG. 16.

Figure 20A:
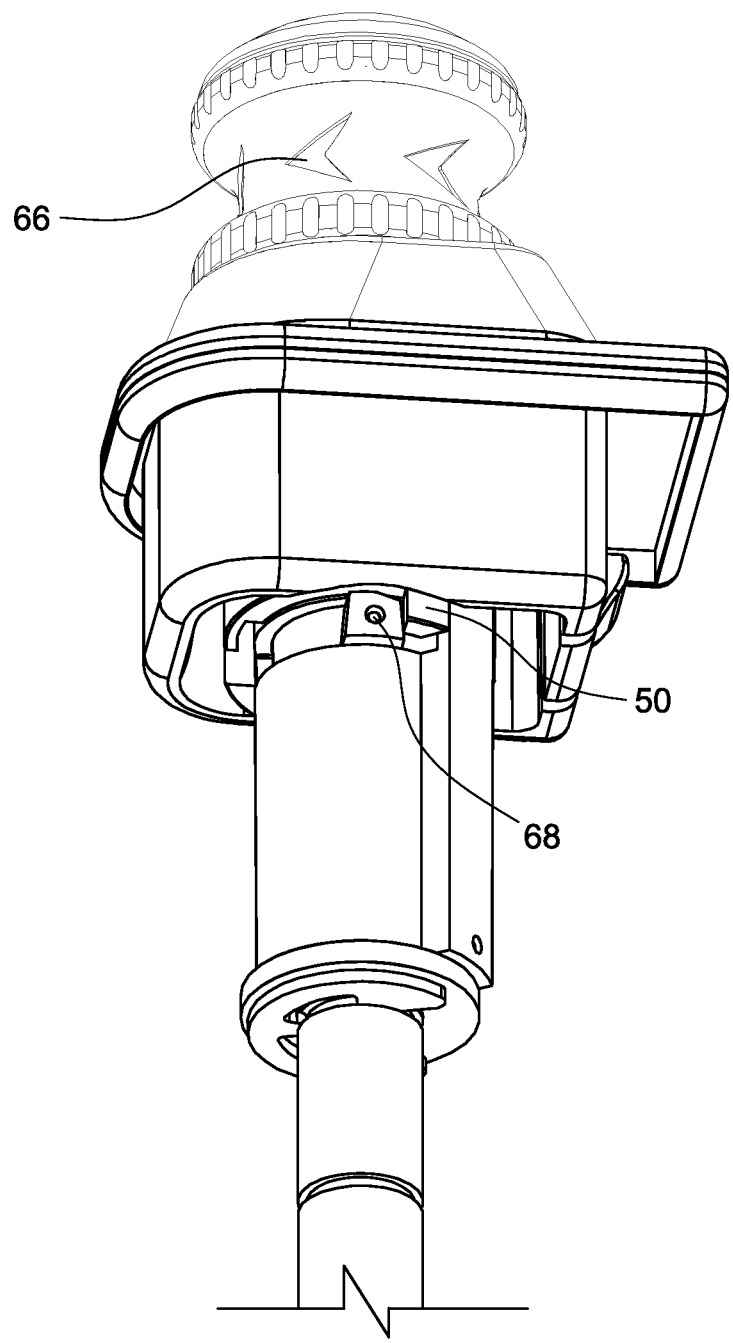
FIGS. 20A through 20C, according to an embodiment of the present invention, are sequential illustrations depicting the angular movement of the guide within the horizontal track.
Figure 20B:
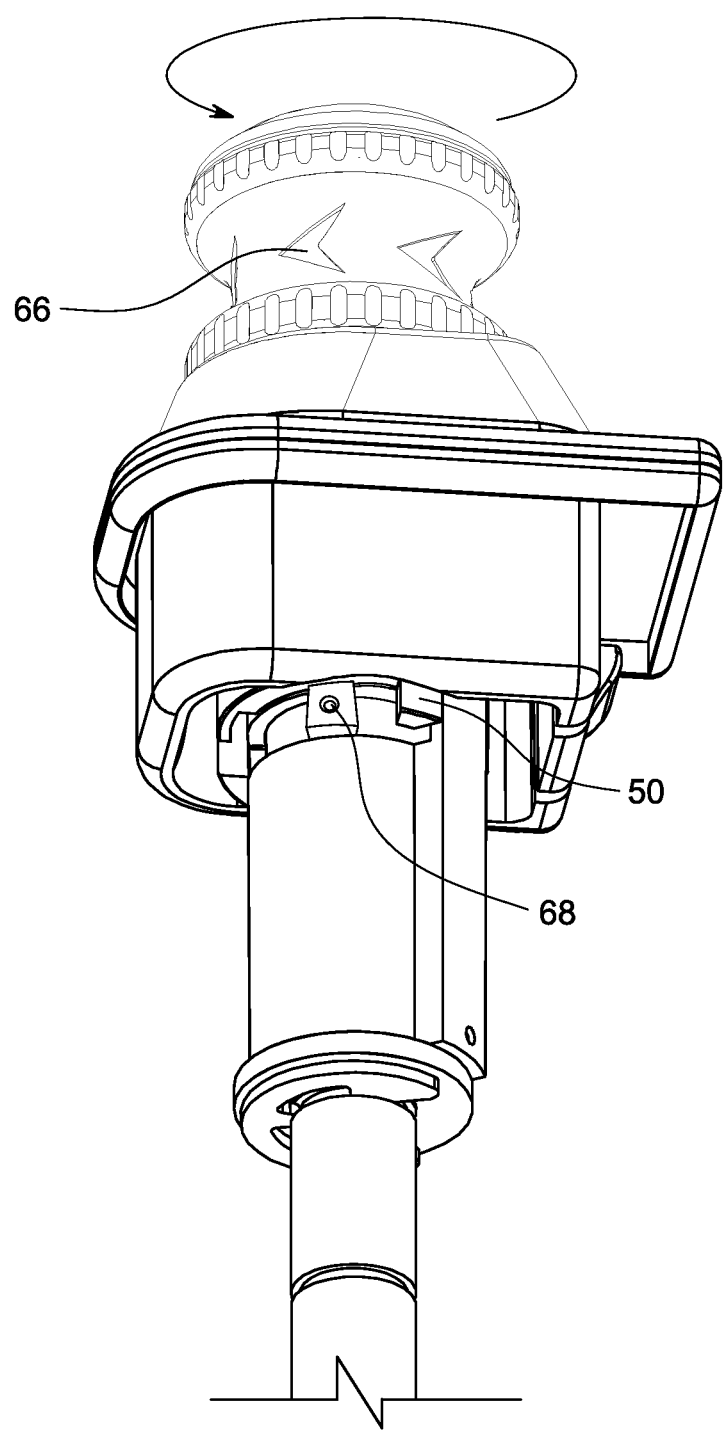
Figure 20C:
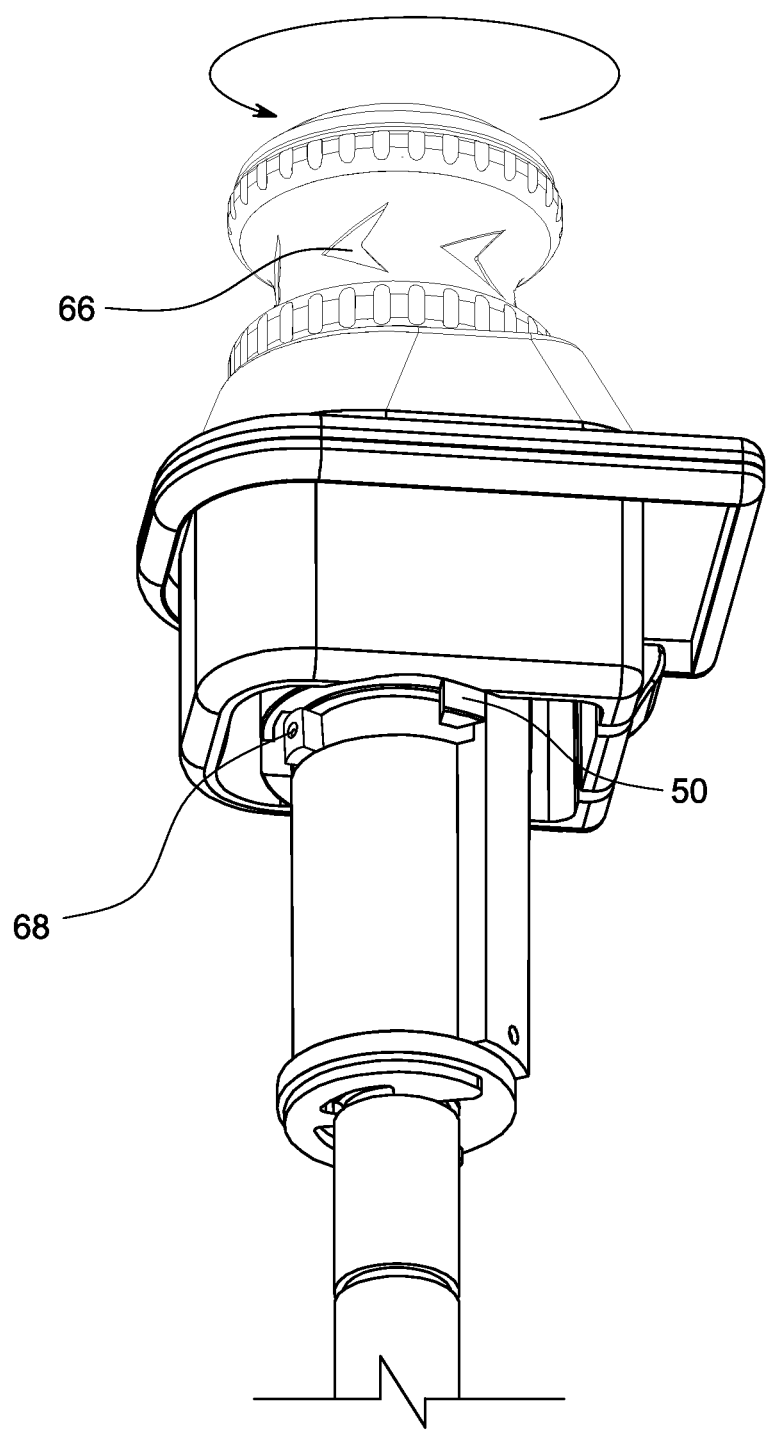
Figure 21A:
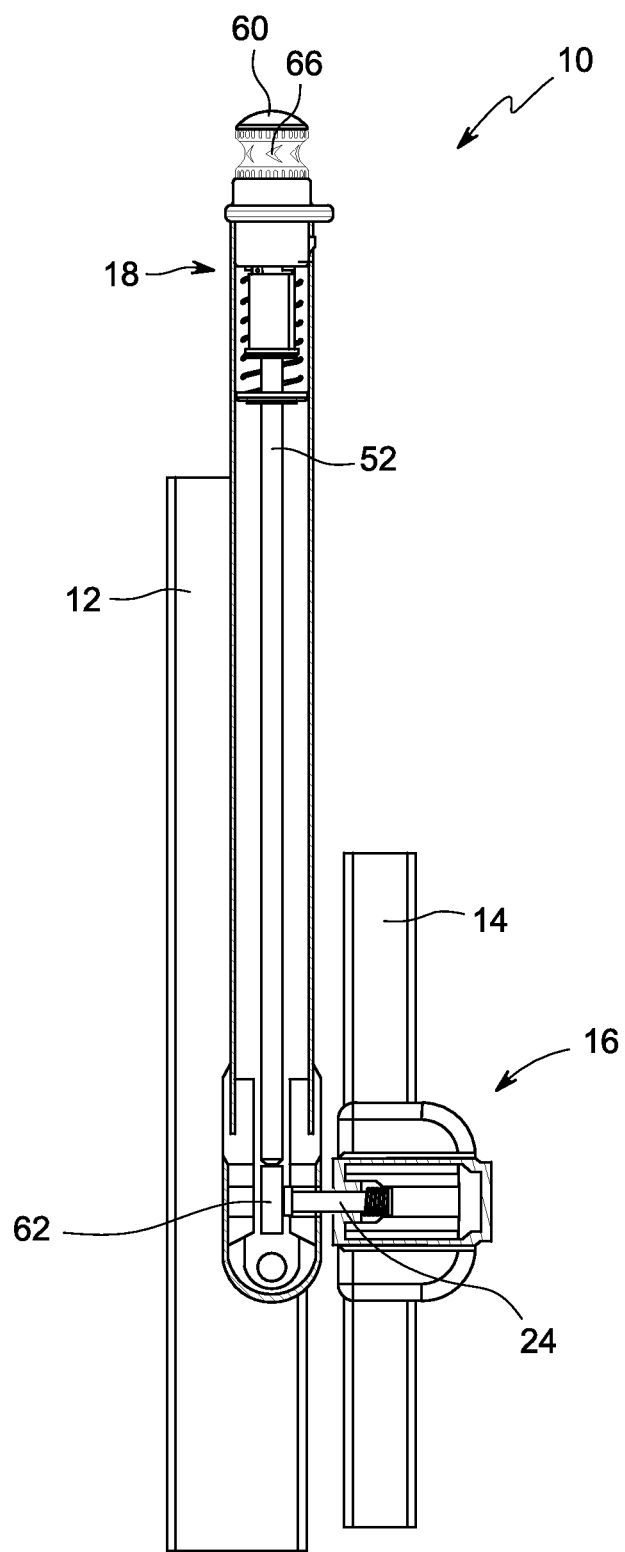
FIGS. 21A and 21B, according to an embodiment of the present invention, are sequential illustrations depicting the unlatching of the latch bar.
Figure 21B:
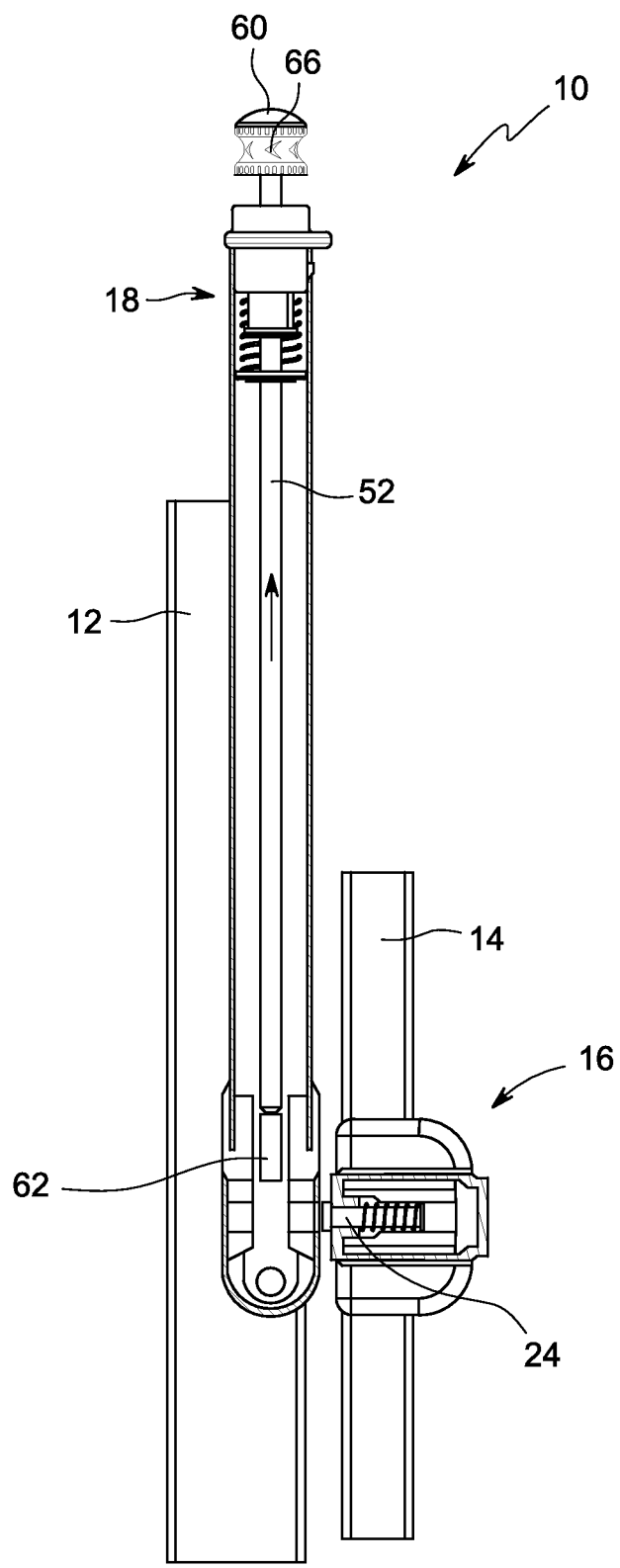

Referring to FIGS. 20A through 20C, the guide, by manual rotation of the twist knob 66, is angularly movable between a default first guide position where, the guide 68 abuts the stopper 50 while abutting the upper circular rim of the track sleeve (as seen in FIG. 20A), and a second guide position, where the guide 68 is at the right extremity of the horizontal track 76 (as seen in FIG. 20C). Referring to FIGS. 21A through 21C, at the second guide position, the magnet bar assembly 52, by manipulation of the pull and twist knobs 60 and 66, is vertically movable between a default downward engagement position, where the magnet 62 is aligned with the latch hole 38, and an upward disengagement position, where the magnet 62 is elevated upward thereby misaligning the magnet 62 and the latch hole 38. Notably, the circular bottom rim of the cap sleeve 44 prevents the guide 68 from moving upward at any position within the horizontal track 76 other than the second guide position.

Referring to FIGS. 20A through 20C, and FIGS. 21A through 21C, in order to latch the hinged gate 12 to the fence post 14, the hinged gate 12 simply needs to be aligned with the fence post 14 at which point, the magnet 62, which, by default, is aligned with the latch hole 38, attracts the latch bar 24 towards itself. As the attraction force of the magnet 62 is configured to be stronger than the opposing force of the spring 34 coiled around the latch bar 24, the latch bar 24 adheres to the magnet 62 through the latch hole 38 thereby latching the hinged gate 12 to the fence post 14 as seen in FIG. 1. In order to release the hinged gate 12 from the latch, initially, the twist knob 66 is twisted clockwise (as seen in FIGS. 20A through 20C) causing the guide 68 to move to the second guide position. At this point, the pull and twist knobs 60 and 66 together are manually lifted upward (as seen in FIGS. 21A through 21C), which causes the magnet bar assembly 52, and thereby the magnet 62, to move upwards. The upward movement of magnet 62 causes the force of attraction between the latch bar 24 and the magnet 62 to weaken resulting in the latch bar 24 being retracted into the latch assembly housing 20 (due to the spring 34) thereby unlatching the hinged gate 12 from the fence post 14. The self-latching device 10 is a safety device and therefore, the pull knob 60 and the twist knob 66 is configured to be at a height that is unreachable for small children.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

What is claimed is:

1. A self-latching magnetic gate latch device for latching a hinged gate to a barrier member, the self-latching device comprising:
    (a) a latch bar housing assembly comprising:
        (i) a latch bar housing fitted to either a hinged gate or a barrier member; and
        (ii) a horizontally-disposed latch bar slidably disposed within the latch bar housing such that, the horizontally-disposed latch bar is axially movable from a default backward latch bar disengagement position to a forward latch bar engagement position, the horizontally-disposed latch bar biased towards the default backward latch bar disengagement position, the horizontally-disposed latch bar attractable by a magnet; and
    (b) a magnet bar housing assembly comprising:
        (i) an elongate magnet bar housing vertically fitted to one of the hinged gate or the barrier member whereon the latch bar housing is not fitted, the elongate magnet bar housing comprising a vertical, cylindrical cap sleeve comprising a first vertical track extending upwardly from a bottom circular rim thereof and a stopper extending downwardly from the bottom circular rim thereof, the elongate magnet bar housing further comprising a latch hole axially aligned with the latch bar; and
        (ii) an elongate vertical magnet bar assembly extending through the vertical, cylindrical cap sleeve, the elongate vertical magnet bar assembly comprising a magnet disposed at a bottom end thereof, the elongate vertical magnet bar assembly disposed within the elongate magnet bar housing such that, the elongate vertical magnet bar assembly is axially vertically movable, the elongate vertical magnet bar assembly further comprising a guide extending perpendicular to an axis of the elongate vertical magnet bar assembly, the guide, in a horizontal plane, manually angularly movable between a default first guide position, where the guide abuts the stopper, and a second guide position, at which point, the guide is at the point of entry of the first vertical track, the guide is biased towards the default first guide position, the angular movement of the guide restricted beyond the stopper and the point of entry of the first vertical track, the elongate vertical magnet bar assembly, at the second guide position, by virtue of the guide being adapted to slide within the first vertical track, manually vertically movable between a default downward engagement position and an upward disengagement position, the elongate vertical magnet bar assembly biased towards the default downward engagement position, where the magnet is aligned with the latch hole;
    wherein, as the elongate vertical magnet bar assembly is in the default downward engagement position, regardless of the position of the guide, and as the hinged gate and the barrier member are juxtaposed, the horizontally-disposed latch bar, which is longitudinally aligned with the magnet in the forward latch bar engagement position, as a result of an attraction force of the magnet, arrives to the forward latch bar engagement position, where the horizontally-disposed latch bar abuts the magnet through the latch hole thereby latching the hinged gate and the barrier member together and wherein, as the elongate vertical magnet bar assembly moved to the upward disengagement position, an increase in a distance between the magnet and the horizontally-disposed latch bar as a result of the upward displacement of the magnet causes the attraction force between the magnet and the horizontally-disposed latch bar to weaken resulting in the horizontally-disposed latch bar being retracted into the default backward latch bar disengagement position thereby unlatching the hinged gate from the barrier member.

2. The self-latching device of claim 1 wherein, the barrier member comprises a fence post.

3. The self-latching device of claim 1 wherein, the barrier member comprises another gate.

4. The self-latching device of claim 1 wherein, the horizontally-disposed latch bar comprises a head portion disposed at an extremity thereof, the head portion to abut the magnet through the latch hole.

5. The self-latching device of claim 1 wherein, the elongate vertical magnet bar assembly comprises:
  (a) an elongate, vertically-disposed magnet bar, one end of which terminating in the magnet, while the other end terminating in a pull knob, the movement of the guide within the first vertical track caused by the vertical movement of the elongate, vertically-disposed magnet bar, the movement of the elongate, vertically-disposed magnet bar operated by the pull knob;
  (b) a cylindrical guide sleeve for receiving the elongate, vertically-disposed magnet bar therethrough, one end of the cylindrical guide sleeve terminating in a twist knob that is adapted to abut and to be disposed below the pull knob, the cylindrical guide sleeve comprising the guide extending perpendicularly from the exterior surface thereof; and
  (c) a cylindrical track sleeve for receiving the cylindrical guide sleeve, the cylindrical track sleeve comprising an angular horizontal track disposed thereon, the angular horizontal track for slidably receiving the guide therewithin, one extremity of the angular horizontal track terminates at the default first guide position, while the other extremity terminates at the second guide position, the angular movement of the guide within the angular horizontal track, by virtue of a rotation of the cylindrical guide sleeve, caused by twisting the twist knob, the cylindrical track sleeve fixedly received within the elongate magnet bar housing such that rotation thereof is inhibited.

6. The self-latching device of claim 5 wherein, the elongate vertical magnet bar assembly further comprises a torsion spring functionally disposed between the cylindrical guide sleeve and the cylindrical track sleeve so as to bias the guide towards the default first guide position.

7. The self-latching device of claim 1 wherein, the elongate magnet bar housing comprises an open top removably fitted with a top cap comprising a central hole wherein, the vertical, cylindrical cap sleeve descends from a circumference of the central hole.

8. The self latching device of claim 7 wherein, the elongate magnet bar housing assembly further comprises a thrust washer secured to the elongate vertical magnet bar assembly and a compression spring disposed between the top cap and the thrust washer; the compression spring for biasing the elongate vertical magnet bar assembly towards the default downward engagement position towards the downward engagement position.

9. A self-latching magnetic gate latch device for latching a hinged gate to a barrier member, the self-latching device comprising:
  (a) a latch bar housing assembly comprising:
    (i) a latch bar housing fitted to either a hinged gate or a barrier member; and
    (ii) a horizontally-disposed latch bar slidably disposed within the latch bar housing such that, the horizontally-disposed latch bar is axially movable from a default backward latch bar disengagement position to a forward latch bar engagement position, the horizontally-disposed latch bar biased towards the default backward latch bar disengagement position, the horizontally-disposed latch bar attractable by a magnet; and
  (b) a magnet bar housing assembly comprising:
    (i) an elongate magnet bar housing vertically fitted to one of the hinged gate or the barrier member whereon the latch bar housing is not fitted, the elongate magnet bar housing comprising a vertical, cylindrical cap sleeve comprising a vertical track extending upwardly from a bottom circular rim thereof and a stopper extending downwardly from the bottom circular rim thereof, the elongate magnet bar housing further comprising a latch hole axially aligned with the latch bar; and
    (ii) an elongate vertical magnet bar assembly extending through the vertical, cylindrical cap sleeve, the elongate vertical magnet bar assembly comprising a magnet disposed at a bottom end thereof, the elongate vertical magnet bar assembly disposed within the elongate magnet assembly housing such that, the elongate vertical magnet bar assembly is axially vertically movable, the elongate vertical magnet bar assembly further comprising a guide extending perpendicular to an axis of the elongate vertical magnet bar assembly, the guide, in a horizontal plane, manually angularly movable between a default first guide position, where the guide abuts the stopper while abutting the bottom circular rim, and a second guide position, at which point, the guide is at the point of entry of position, the angular movement of the guide restricted beyond the stopper and the point of entry of the vertical track, the elongate vertical magnet bar assembly, at the second guide position, by virtue of the guide being adapted to slide within the vertical track, manually vertically movable between a default downward engagement position and an upward disengagement position, the elongate vertical magnet bar assembly biased towards the default downward engagement position, where the magnet is aligned with the latch hole, the elongate vertical magnet bar assembly comprising:
      (1) an elongate, vertically-disposed magnet bar, one end of which terminating in the magnet, while the other end terminating in a pull knob, the movement of the guide within the vertical track caused by the vertical movement of the elongate, vertically-disposed magnet bar, the movement of the elongate, vertically-disposed magnet bar operated by the pull knob;

(2) a cylindrical guide sleeve for receiving the elongate, vertically-disposed magnet bar therethrough, one end of the cylindrical guide sleeve terminating in a twist knob that is adapted to abut and to be disposed below the pull knob, the cylindrical guide sleeve comprising the guide extending perpendicularly from the exterior surface thereof; and (3) a cylindrical track sleeve for receiving the cylindrical guide sleeve, the cylindrical track sleeve comprising an angular horizontal track disposed thereon, the angular horizontal track for slidably receiving the guide therewithin, one extremity of the angular horizontal track terminates at the default first guide position, while the other extremity terminates at the second guide position, the angular movement of the guide within the angular horizontal track, by virtue of a rotation of the cylindrical guide sleeve, caused by twisting the twist knob, the cylindrical track sleeve fixedly received within the elongate magnet bar housing such that rotation thereof is inhibited;

wherein, as the elongate vertical magnet bar assembly is in the default downward engagement position, regardless of the position of the guide, and as the hinged gate and the barrier member are juxtaposed, the horizontally-disposed latch bar, which is longitudinally aligned with the magnet in the forward latch bar engagement position, as a result of an attraction force of the magnet, arrives to the forward latch bar engagement position, where the horizontally-disposed latch bar abuts the magnet through the latch hole thereby latching the hinged gate and the barrier member together and wherein, as the elongate vertical magnet bar assembly moved to the upward disengagement position, an increase in a distance between the magnet and the horizontally-disposed latch bar as a result of the upward displacement of the magnet causes the attraction force between the magnet and the horizontally-disposed latch bar to weaken resulting in the horizontally-disposed latch bar being retracted into the default backward latch bar disengagement position thereby unlatching the hinged gate from the barrier member.

* * * * *